ём
United States Patent
Lim et al.

(10) Patent No.: US 7,891,249 B2
(45) Date of Patent: Feb. 22, 2011

(54) MULTI-AXIS VIBRATION METHOD AND APPARATUS

(75) Inventors: Jui Jing Lim, Singapore (SG); Xiong Liu, Singapore (SG); Ying Su, Singapore (SG); Thia Kong Beng, Singapore (SG); Yi Ren Hong, Singapore (SG); Kok Tong Soh, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 568 days.

(21) Appl. No.: 11/832,423

(22) Filed: Aug. 1, 2007

(65) Prior Publication Data

US 2009/0031815 A1 Feb. 5, 2009

(51) Int. Cl.
*B06B 3/00* (2006.01)
(52) U.S. Cl. .......................... 73/663; 73/667
(58) Field of Classification Search .............. 73/663, 73/667
See application file for complete search history.

(56) References Cited

U.S. PATENT DOCUMENTS

| | | | | |
|---|---|---|---|---|
| 2,306,110 A * | 12/1942 | Pendleton | ............... | 73/668 |
| 3,581,739 A * | 6/1971 | Brandt et al. | ............... | 73/666 |
| 3,690,145 A * | 9/1972 | Brisard | ............... | 73/11.08 |
| 3,712,120 A * | 1/1973 | Fletcher et al. | ............... | 73/663 |
| 4,181,028 A * | 1/1980 | Talbott, Jr. | ............... | 73/665 |
| 4,848,160 A | 7/1989 | Marshall et al. | ............... | 73/663 |
| 5,042,306 A | 8/1991 | Cericola et al. | ............... | 73/667 |
| 5,156,051 A | 10/1992 | Marshall | ............... | 73/663 |
| 5,277,066 A * | 1/1994 | Marshall | ............... | 73/663 |
| 5,650,569 A * | 7/1997 | Liu | ............... | 73/663 |
| 2002/0144552 A1 | 10/2002 | Eneroth et al. | ............... | 73/662 |

\* cited by examiner

*Primary Examiner*—Hezron Williams
*Assistant Examiner*—Nashmiya Fayyaz
(74) *Attorney, Agent, or Firm*—Deirdre Kuale

(57) ABSTRACT

A vibration test apparatus is disclosed. The vibration test apparatus includes a platform assembly, which receives a vibration input from a vibration source and imparts a multi-axial vibration to a test specimen on the platform assembly. In illustrated embodiments the platform assembly includes one or more platforms having an adjustable incline angle. The incline angle is adjusted to provide the desired output vibration based upon a measured or determined vibration profile and the input vibration from the vibration source.

11 Claims, 6 Drawing Sheets

MULTI-AXIS VIBRATION METHOD AND APPARATUS

BACKGROUND

Electronic products and in particular, portable electronic products are susceptible to vibration. Vibration can interfere with operation and degrade lifetime performance of such products. For example, various portable electronic products, such as mobile phones, include data storage devices, which have rotating data storage elements. Vibration can interfere with the operation of said rotating data storage elements.

SUMMARY

The present application relates to a vibration test apparatus and method. The vibration test apparatus includes a platform assembly, which receives a vibration input from a vibration source and imparts a multi-axial vibration to a test specimen on the platform assembly. In illustrated embodiments the platform assembly includes one or more platforms having an adjustable incline angle. The incline angle is adjusted to provide the desired output vibration based upon a measured or determined vibration profile. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
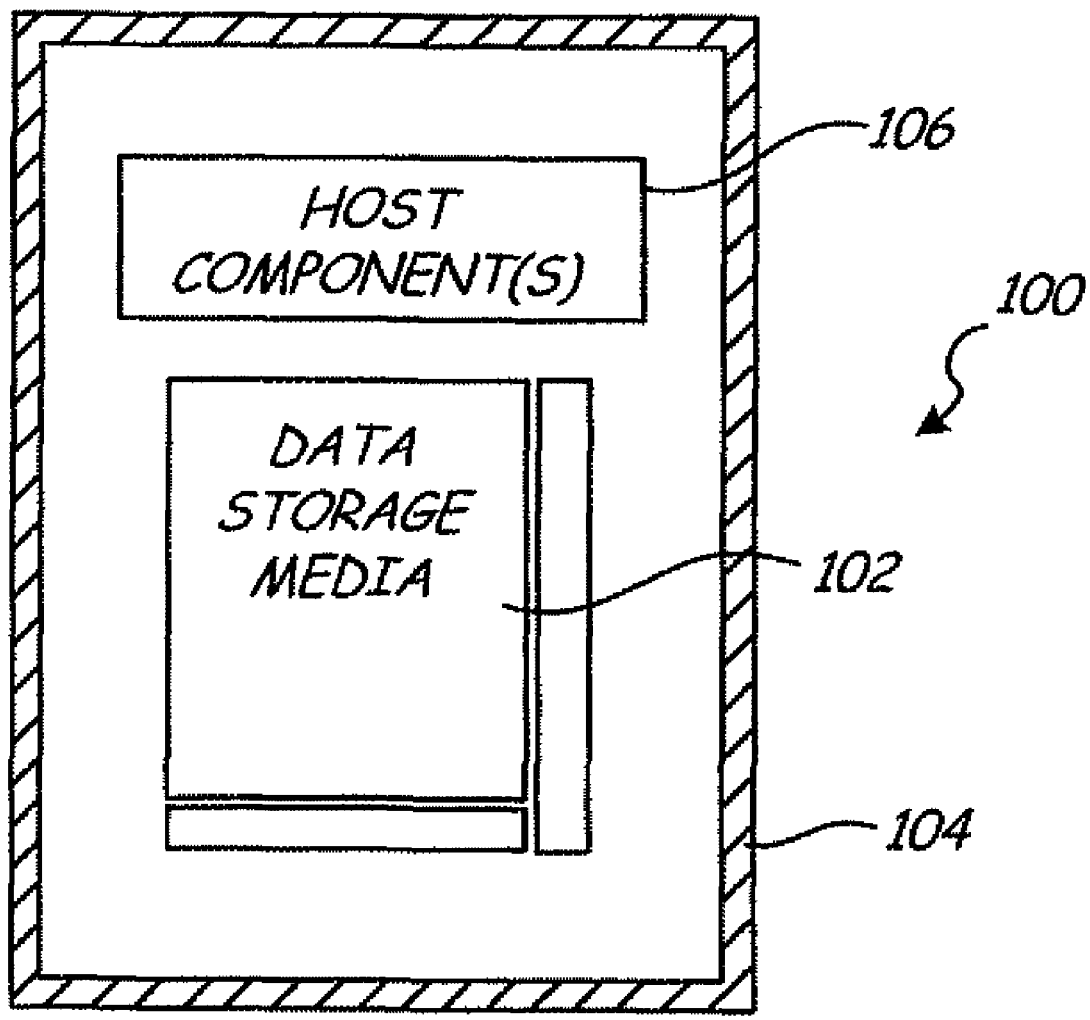
FIG. 1 is a schematic illustration of a portable electronic device susceptible to vibration.

Device such as portable electronic devices of the type illustrated in FIG. 1 are exposed to vibration during use. Such vibration can interfere with operation of the device. The device illustrated in FIG. 1 is a mobile phone device 100, which includes a data storage media 102 enclosed within a housing or casing 104 of the device. The device 100 also includes host component(s) 106 that interface with the data storage media 102 to read and/or write data to the data storage media 102. Illustratively, the data storage media 102 includes one or more rotating discs and one or more adjustable heads to read and/or write data to the rotating discs. Vibration of the device 100 can interfere with operation of the data storage media, and in particular, operation of the one or more heads and discs, or other components of the device. Typically electronic devices include damping components or other design features to limit the effects of vibration. Damping components or features can be designed utilizing mathematical modeling techniques, however, mathematical modeling techniques may not adequately predict actual vibration performance.

Figure 2:
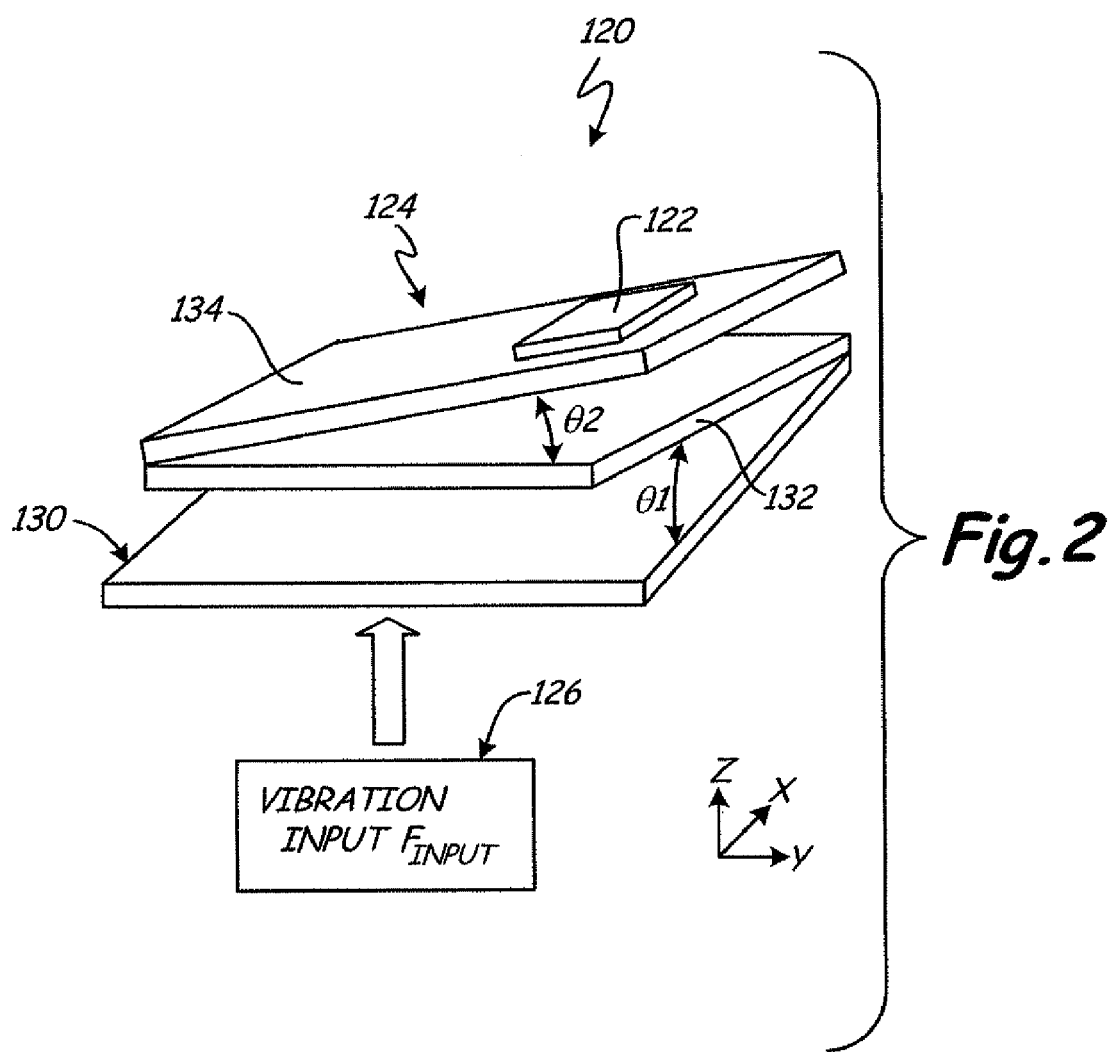
FIG. 2 schematically illustrates a test apparatus including a platform assembly and vibration source.

FIG. 2 illustrates an embodiment of a test apparatus 120 for testing vibration performance of a test specimen 122 such as the portable electronic device 100 of the type illustrated in FIG. 1. The illustrated test apparatus 120 includes a platform assembly 124, which is configured to receive a vibration input $F_{input}$ from a vibration source 126 and output a multi-axial vibration to the test specimen 122 supported on or coupled to the platform assembly 124. Illustratively, the vibration source 126 is a shaker device or similar device, which provides an input vibration along a single axis such as one of the x, y or z axes illustrated in FIG. 2.

In the embodiment illustrated in FIG. 2, the platform assembly 124 includes a base portion 130, a first inclined platform 132 coupled to the base portion 130 and a second inclined platform 134 coupled to the first inclined platform 132. As shown the first inclined platform 132 is coupled to the base portion 110 at an incline angle $\theta_1$. The second inclined platform 134 is coupled to the first inclined platform 132 at an incline angle $\theta_2$ to impart a multi-axial vibration to the test specimen 122 supported on the second platform 134 as shown. The axis of incline angle $\theta_2$ is orthogonal to the axis of incline angle $\theta_1$.

As previously described, the multi-axial vibration is imparted to the test specimen 122 through the platform assembly 124 in response to the vibration input $F_{input}$ from the vibration source 126. In the embodiment illustrated in FIG. 2, the platform assembly 124 is orientated to receive a vibration input $F_{input}$ along the z-axis (i.e., $F_{input}=F_{input-z}$), although application is not limited to a particular orientation or $F_{input}$. For example, the input vibration from the vibration source 126 can be orientated relative to the x, y or z axes to provide $F_{input}=F_{input-x}$, $F_{input}=F_{input-y}$, or $F_{input}=F_{input-z}$.

Figure 3:
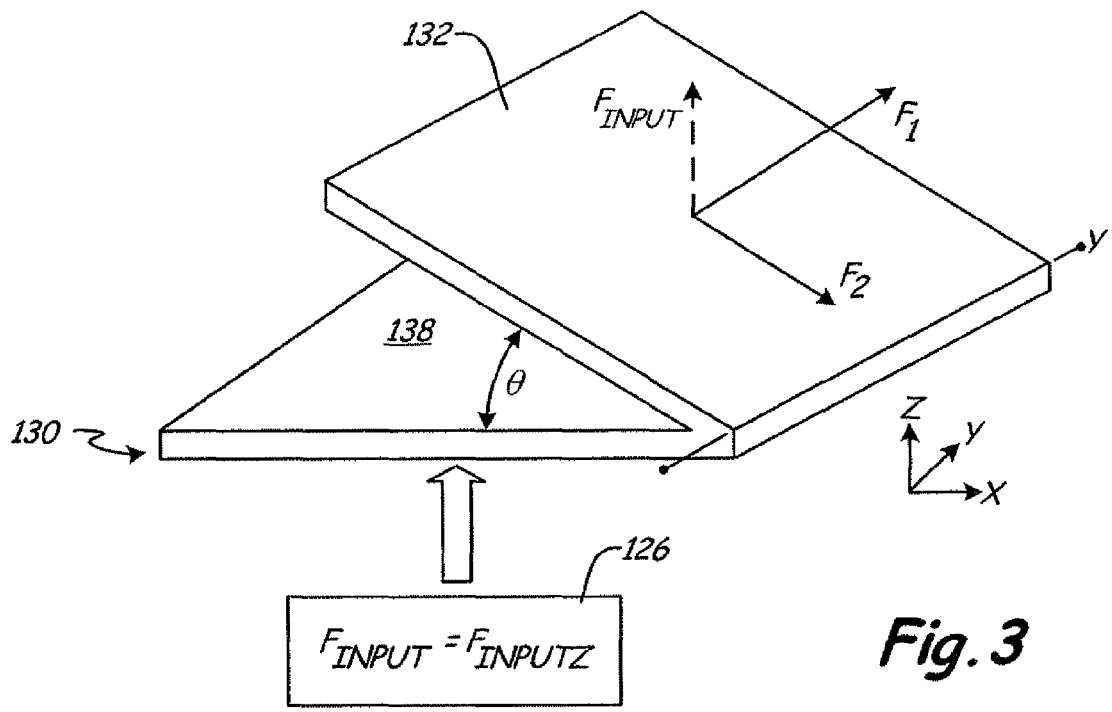
FIG. 3 is a schematic illustration of a first inclined platform of a platform assembly for a test apparatus as illustrated in FIG. 2.
Figure 4:
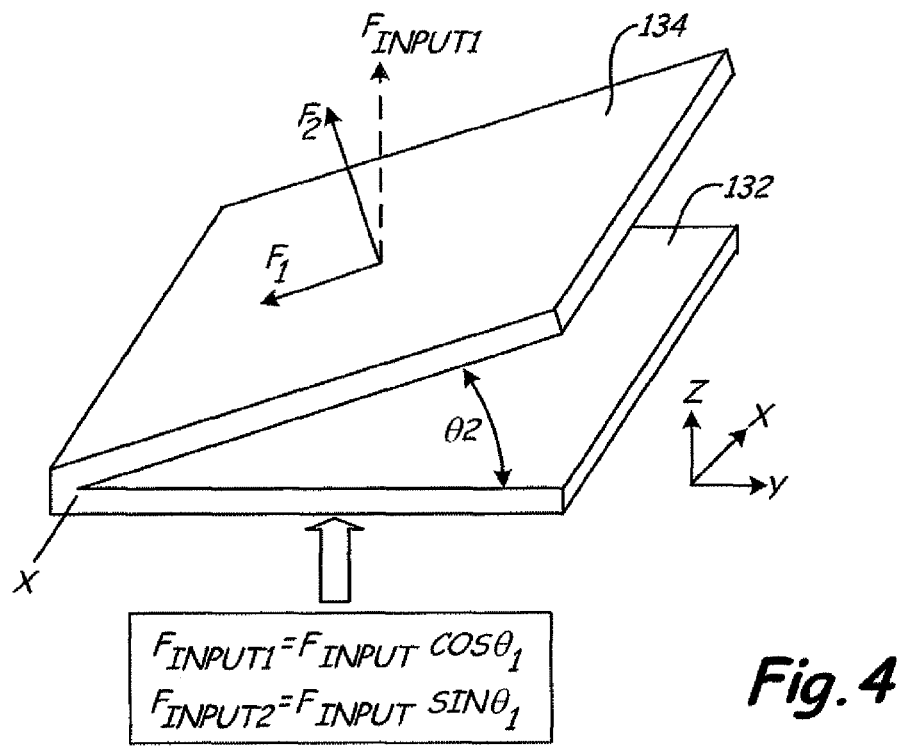
FIG. 4 is a schematic illustration of a second inclined platform of a platform assembly for a test apparatus as illustrated in FIG. 2.

FIGS. 3-4 illustrate components of the platform assembly 124 illustrated in FIG. 2. As shown in FIG. 3, the first platform 132 is coupled to base platform 138 and receives input vibration $F_{input}$ from the vibration source 126 to provide multi-axis vibration components through the first platform as follows:

$$F_1 = F_{input} \cos \theta_1;$$

$$F_2 = F_{input} \sin \theta_1$$

where $F_{input}$ is the input vibration from the vibration source 126; and $\theta_1$ is the incline angle of the first platform 132.

In the illustrated embodiment shown, where $F_{input}=F_{input-z}$ and the first platform 132 is inclined relative to the y axis at angle $\theta_1$ the force components are provided as follows:

$$F_z = F_{input-z} \cos \theta_1; \text{ and}$$

$$F_x = F_{input-z} \sin \theta_1$$

FIG. 4 illustrates the second platform 134 inclined at angle $\theta_2$ relative to first platform 132. As shown in FIG. 4, the second platform 134 is coupled to the first platform 132 and receives input vibration components $F_{input1}=F_{input} \cos \theta_1$ and $F_{input2} = F_{input} \sin \theta_1$ to provide a multi-axial test vibration through the second platform 134 including vibration components as follows:

$$F_1 = F_{input} \cos \theta_1 \cos \theta_2;$$

$$F_2 = F_{input} \cos \theta_1 \sin \theta_2;$$

$$F_3 = F_{input} \sin \theta_1$$

In the illustrated embodiment shown, where $F_{input} = F_{input-z}$ and the first platform 132 is inclined relative to the y axis at $\theta_1$ and the second platform 134 is inclined relative to the x axis at $\theta_2$, the platform assembly 124 provides vibration components:

$$F_z = F_{input-z} \cos \theta_1 \cos \theta_2;$$

$$F_y = F_{input-z} \cos \theta_1 \sin \theta_2;$$

$$F_x = F_{input-z} \sin \theta_1$$

where $F_{input-z}$ is an input vibration from the vibration source 126 orientated along the z axis;

$\theta_1$ is the incline angle of the first platform 132 relative to the y-axis.

$\theta_2$ is the incline angle of the second platform 134 relative to the x-axis.

Figure 5:
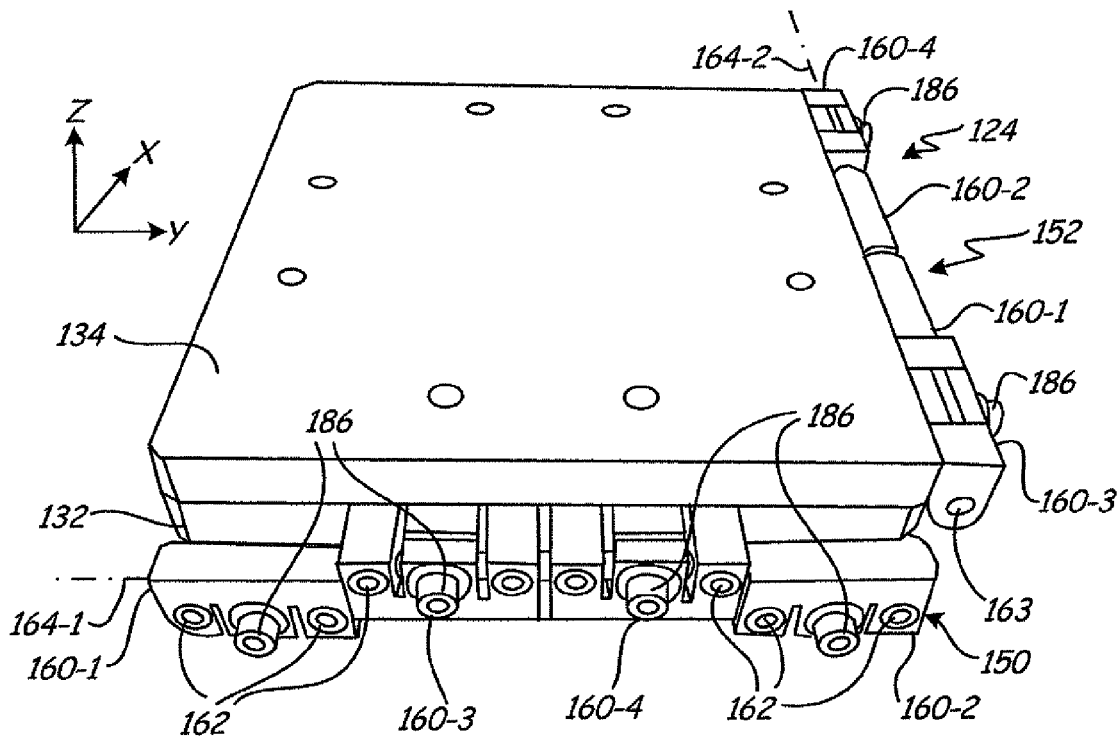
FIG. 5 schematically illustrates an embodiment of a platform assembly including a plurality of adjustable platforms.
Figure 6:
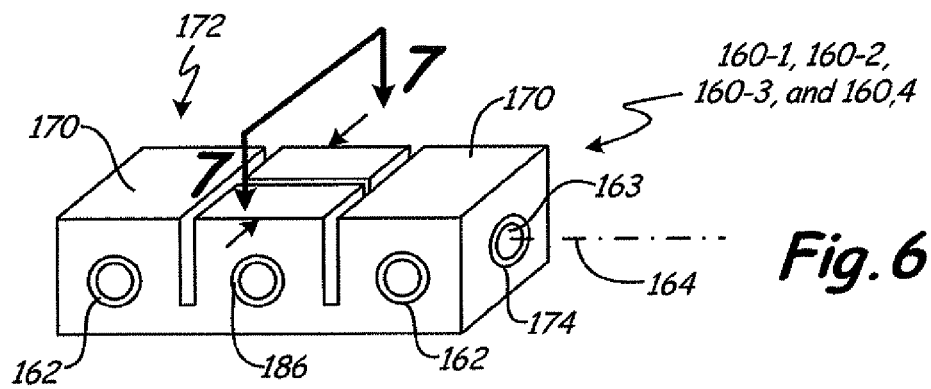
FIG. 6 schematically illustrates an embodiment of a bracket portion for hinge assemblies for pivotally connecting inclined platforms of the platform assembly illustrated in FIG. 5.
Figure 7:
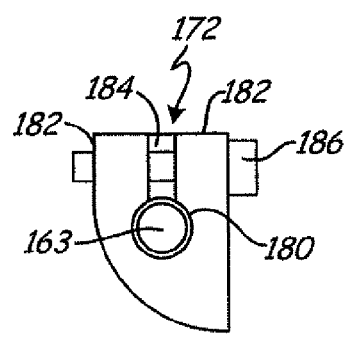
FIG. 7 is a cross-sectional view taken along line 7-7 of FIG. 6.

In the platform assembly 124 shown in FIG. 2, the first platform 132 is inclined relative to the base portion 110 and the second platform 134 is inclined relative to the first platform 132 to provide the multi-axis test vibration to the test specimen 122 through the platform assembly 124. FIGS. 5-7 illustrate an embodiment of a platform assembly 124 where the first platform 132 is pivotally coupled to the base portion 130 and the second platform 134 is pivotally coupled to the first platform 132 to provide adjustable incline angles $\theta_1$ and $\theta_2$ for platforms 132, 134 respectively. The incline angles $\theta_1$ and $\theta_2$ are adjusted to provide a desired vibration profile to the test specimen 122.

In the embodiment illustrated in FIG. 5, the first platform 132 is pivotally coupled to a base portion or platform (not visible in FIG. 5) through a hinge assembly 150 and the second platform 134 is pivotally coupled to the first platform 132 via hinge assembly 152. As shown in FIG. 5 each of the hinge assemblies 150, 152 includes a plurality of bracket portions to pivotally connect the first platform 132 to the base portion and the second platform 134 to the first platform 132. In the embodiments shown in FIG. 5, the plurality of bracket portions includes bracket portions 160-1, 160-2 connected to a perimeter edge of the base portion (not visible in FIG. 5) and bracket portions 160-3, 160-4 connected to a perimeter edge of the first platform 132. The bracket portions 160-1, 160-2, 160-3, 160-4 are connected to the base portion and the first platform 132, respectively, via fasteners 162. In the illustrated embodiment fastener 162 is a bolt however, application is not limited to a bolt fastener and other fastening devices or adhesives can be used. Bracket portions 160-3, 160-4 rotate relative to bracket portions 160-1, 160-2 to adjust the incline angle $\theta_1$ of the first platform 132 relative to the base portion 110.

Similarly, hinge assembly 152 includes bracket portions 160-1, 160-2 connected to a perimeter edge of the first platform 132 and bracket portions 160-3, 160-4 connected to a perimeter edge of the second platform 134. Bracket portions 160-3, 160-4 rotate relative to bracket portions 160-1, 160-2 to adjust the incline angle $\theta_2$ of the second platform 134 relative to the first platform 132. Although a particular number of bracket portions are shown for hinge assemblies 150, 152, application is not limited to the particular number shown as the hinge assemblies 150, 152 can include any number of bracket portions.

Bracket portions 160-3 and 160-4 rotate relative to bracket portions 160-1, 160-2 via an elongate rod 163 that rotationally connects the plurality of bracket portions 160-1-160-4 along a rotation axis. In the illustrated embodiment, bracket portions of the hinge assembly 150 rotate about a first rotation axis 164-1 and the bracket portions of the hinge assembly 152 rotate about a second rotation axis 164-2 orthogonal to the first rotation axis 164-1 to provide orthogonal incline angles $\theta_1$ and $\theta_2$. In the illustrated embodiment, the first rotation axis 164-1 is aligned with the y-axis and the second rotation axis 164-2 is aligned with the x-axis. In an alternate embodiment, the first rotation axis 164-1 is aligned with the x-axis and the second rotation axis 164-2 is aligned with the y-axis, as application is not limited to any specific orientation for the vibration source 126 or platform assembly 124.

FIG. 6 is a detailed illustration of an embodiment of the bracket portions 160-1-160-4 of the hinge assemblies 150, 152. As shown, bracket portions 160-1 through 160-4 include rigid end portions 170 and a flexible inner portion 172 between the rigid end portions 170. Rod 163 extends through a channel 174 formed through the rigid end portions 170 and the flexible inner portion 172 to form the rotation axes 164-1 and 164-2 as previously described.

As shown in FIG. 7, the flexible inner portion 172 forms a clamping mechanism to restrict rotation of the bracket portions in a clamp position and allow rotation of the bracket portions in an unclamped position to adjust incline angles $\theta_1$ and/or $\theta_2$ as previously described. The flexible inner portion 172 includes a "U" shaped body forming a channel portion 180 and opposed flexible arm portions 182 separated by a gap 184. Rod 163 extends through channel portion 180 to provide the pivotal connection for the bracket portions. The spacing or gap 184 for the opposed flexible arm portions 182 is adjusted to adjust the diameter or dimension of the channel portion 180 to selectively clamp and release the bracket portions relative to rod 163. The spacing or position of the opposed flexible arm portions 182 is adjusted via a bolt 186 that extends through arm portions 182 and gap 184 to adjust the spacing between flexible arm portions 182.

To clamp or lock the incline angles $\theta_1$ and/or $\theta_2$, the bolt 186 is tightened to reduce the spacing or gap between the arm portions 182 so that the flexible inner portion 172 squeezes against rod 163 to restrict rotation of the bracket portions about rod 163. To release the hinge assemblies 150 and/or 152, the bolt 186 is loosened to increase the spacing or gap 184 to facilitate rotation of the bracket portion about rod 163 to adjust the incline angles $\theta_1$ and/or $\theta_2$ as previously described. In the embodiment illustrated in FIG. 5, the platform assembly includes first and second adjustable platforms, however application is not limited to the particular embodiment shown. For example, in one embodiment, the platform assembly 124 can include one or more adjustable incline platforms depending upon the desired vibration profile.

Figure 8:
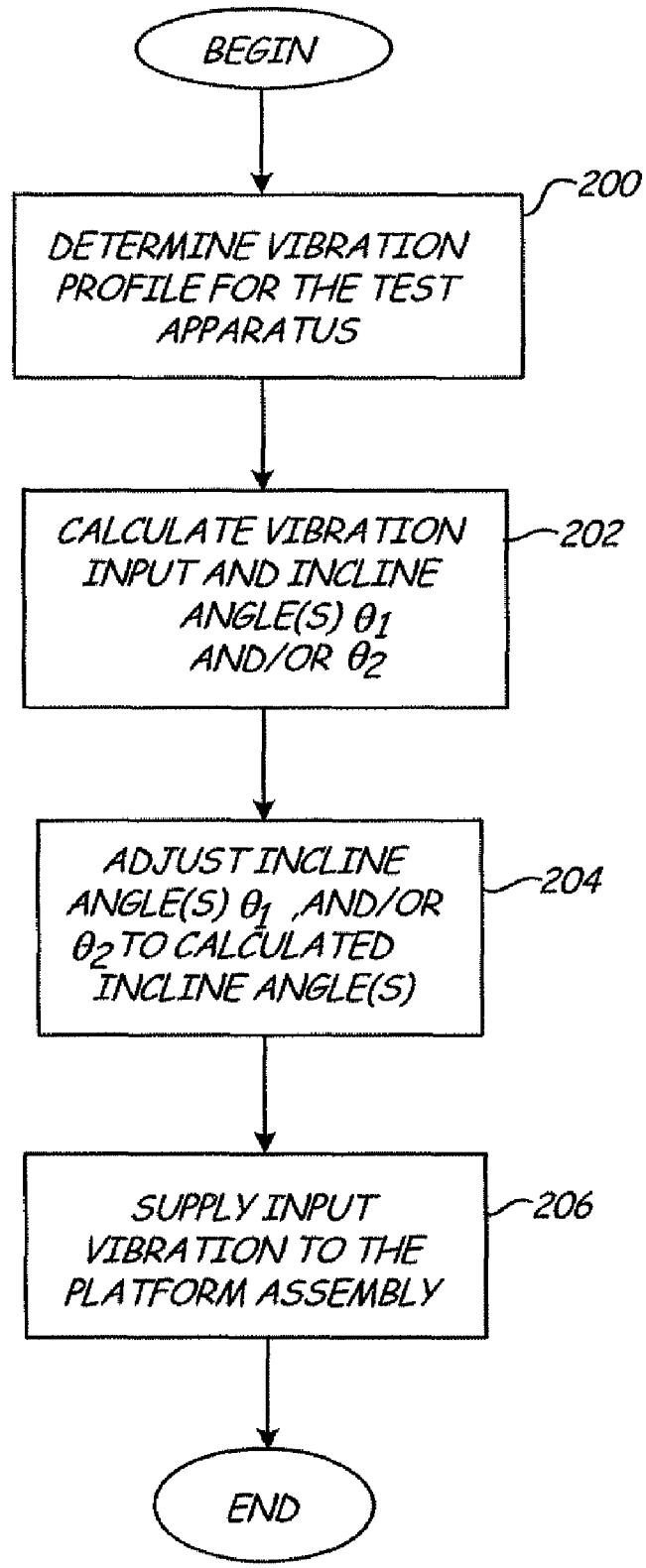
FIG. 8 is a flow chart illustrating steps for vibration testing using a test apparatus including an input vibration and one or more adjustable inclined platforms.

FIG. 8 is a flow chart for vibration testing. As shown, the vibration profile for the test apparatus is determined in step 200 to provide a desired vibration test profile. In an illustrated embodiment, the vibration profile is determined by measuring vibration on a test device using an accelerometer or other measurement device. The accelerometer is coupled to the test device to measure vibrations. For example, the accelerometer can be coupled to a mobile phone device or casing to measure vibration input to a data storage media of the mobile phone device. In an illustrated example, the accelerometer is an tri-axial accelerometer to measure tri-axial vibration components for the test application.

The measured vibration or profile is used to determine input vibration components for the test apparatus 120 as shown in step 202. In particular, in step 202, the measured vibration is used to calculate input vibration $F_{input}$ for the vibration source 126 and incline angles $\theta_1$ and $\theta_2$ for platforms of a test apparatus. As shown in step 204, the platforms are adjusted to the incline angles calculated in step 202 and locked into position for testing. For testing, the test specimen 122 is secured to the platform assembly 124 and the vibration input $F_{input}$ from the vibration source 126 is supplied to the platform assembly 124 as shown in step 206 as previously described. The test specimen 122 is secure to the platform assembly 124 of the test apparatus via fasteners or an adhesive and application is not limited to any particular device for securing the test specimen 122 to the platform assembly 124 for testing.

Figure 9:
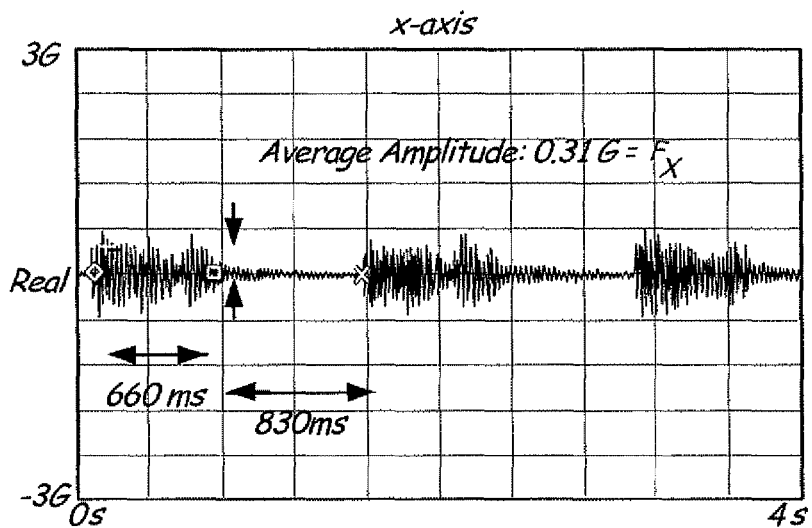
FIGS. 9-11 graphically illustrate measured vibration for use in determining vibration input for a vibration test apparatus as illustrated in FIG. 2.
Figure 10:
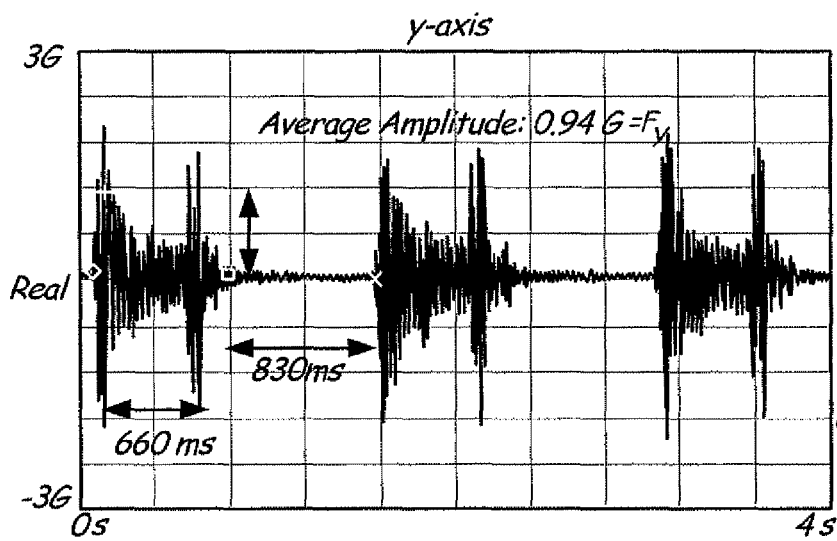
Figure 11:
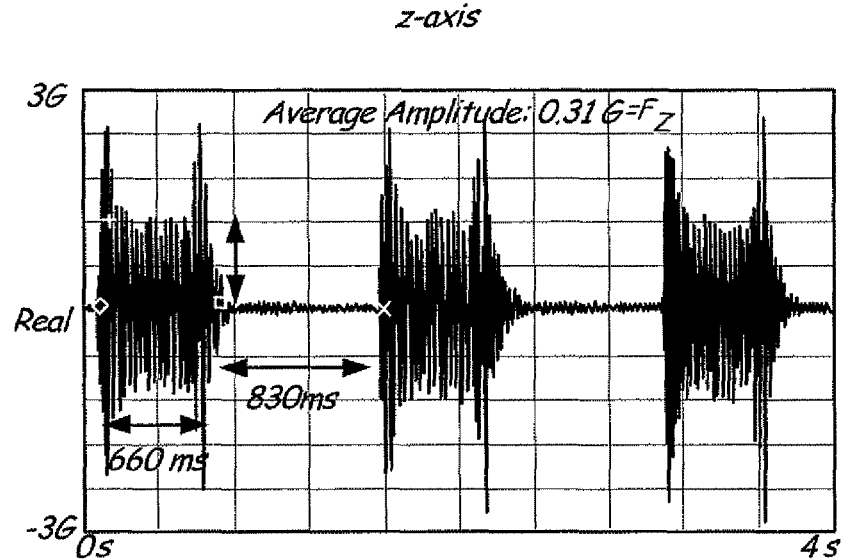

In the illustrated embodiment, test components $F_x$, $F_y$ and $F_z$ are derived based upon measurement data for x, y, z tri-axial vibration components 210, 212, 214 of a test device as illustrated in FIGS. 9-11, respectively. The incline angles $\theta_1$ and $\theta_2$ of the platform assembly 124 and the $F_{input}$ for the vibration source 126 are calculated using the following equations to provide the desired or measured vibration components $F_x$, $F_y$ and $F_z$.

$$F_{input} = \sqrt{F_x^2 + F_y^2 + F_z^2}$$

$$\Theta_1 = \sin^{-1}\left(\frac{F_x}{F_{input}}\right)$$

$$\Theta_2 = \sin^{-1}\left(\frac{F_y}{F_{input}\cos\Theta_1}\right)$$

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention.

What is claimed is:

1. A test apparatus comprising:
   a platform assembly in combination with a vibration source, the platform assembly including
      a base portion configured to receive a vibration input from the vibration source;
      a first platform pivotally coupled to the base portion via a first hinge assembly and positioned at a first adjustable incline angle; and
      a second platform pivotally coupled to the first platform via a second hinge assembly and positioned at a second adjustable incline angle to provide a multi-axis vibration through the first and second platforms,
   wherein the first and second hinge assemblies include a clamping portion having a clamping position to restrict rotation of the first and second hinge assemblies and an unclamped position to adjust the first and second incline angles of the first and second platforms.

2. The test apparatus of claim 1 wherein the first platform is pivotally coupled to the base portion to rotate about a first axis and the second platform is pivotally coupled to the first platform to rotate about a second axis orthogonal to the first axis.

3. The test apparatus of claim 2 wherein the first and second axes are orthogonal to an axis of the vibration input.

4. A vibration test platform assembly for a test apparatus comprising:
   a base portion adapted to receive an input vibration from a vibration source; and
   a first platform pivotally coupled to the base portion to adjust a first incline angle that is greater than zero and configured to receive the input vibration and provide a multi-axial vibration input to a second platform coupled to the first platform at a second incline angle greater than zero, and the second platform is configured to receive the multi-axis vibration input and provide a tri-axial vibration input to a test specimen.

5. The vibration test platform assembly of claim 4 wherein the second platform is pivotally coupled to the first platform to adjust the second incline angle of the second platform.

6. The vibration test platform assembly of claim 4 wherein the first incline angle is inclined relative to a first axis and the second incline angle is inclined relative to a second axis and the first and second axes are orthogonal.

7. The vibration test platform assembly of claim 4 wherein the multi-axial vibration input provided by of the first platform includes a first force $F_1 = F_{input} \cos \theta_1$ and second $F_2 = F_{input} \sin \theta_1$, where $F_{input}$ is the input vibration and $\theta_1$ is the first incline angle of the first platform.

8. The vibration test platform assembly of claim 4 wherein the tri-axial vibration input provided by the second platform includes force components $F_1 = F_{input} \cos \theta_1 \cos \theta_2$; $F_2 = F_{input} \cos \theta_1 \sin \theta_2$; and $F_3 = F_{input} \sin \theta_1$ where $F_{input}$ is the input vibration and $\theta_1$ is the first incline angle of the first platform and $\theta_2$ is the second incline angle of the second platform.

9. The vibration test platform assembly of claim 4 in combination with the vibration source.

10. A test apparatus comprising:
    a platform assembly in combination with a vibration source, the platform assembly including
       a base portion configured to receive a vibration input from the vibration source;
       a first platform pivotally coupled to the base portion to rotate about a first axis, the first platform positioned at a first adjustable incline angle; and
       a second platform pivotally coupled to the first platform to rotate about a second axis orthogonal to the first axis, the second platform positioned at a second adjustable incline angle to provide a multi-axis vibration through the first and second platforms.

11. The test apparatus of claim 10 wherein the first and second axes are orthogonal to an axis of the vibration input.

* * * * *